UNITED STATES PATENT OFFICE.

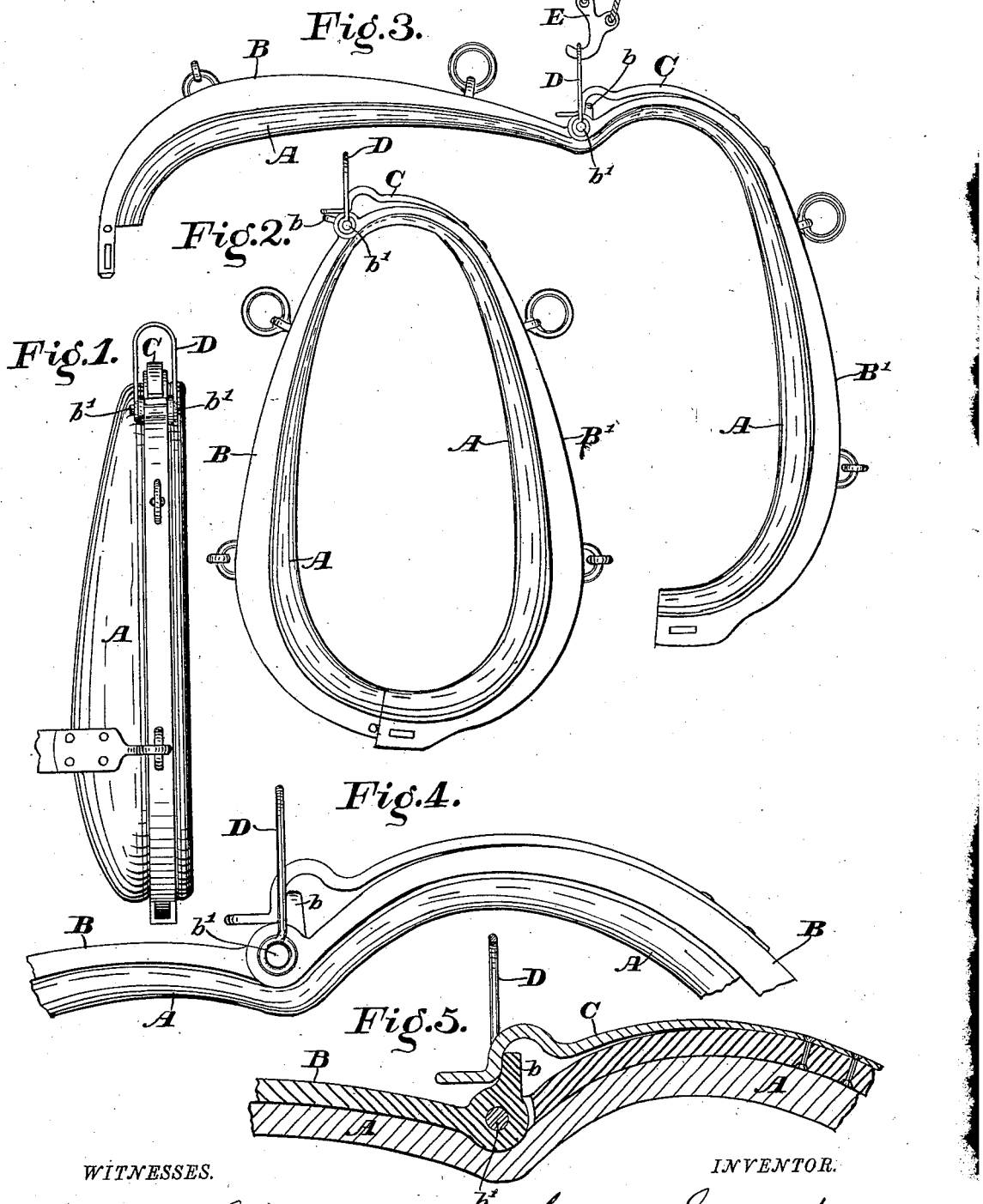

CICERO SEIBERT, OF INDIANAPOLIS, INDIANA.

HAME.

SPECIFICATION forming part of Letters Patent No. 267,266, dated November 7, 1882.

Application filed September 18, 1882. (No model.)

*To all whom it may concern:*

Be it known that I, CICERO SEIBERT, of the city of Indianapolis, county of Marion, and State of Indiana, have invented certain new and useful Improvements in Hames, of which the following is a specification.

The object of my said invention is to provide combined hames and collar, for use especially in fire-departments, which shall be adapted to be placed upon the horses much more quickly than ordinary hames. This object is accomplished by hinging the hames together at or near the top, providing a spring, in connection with said hinge, which will either operate to hold the hames open or permit them to be closed, and providing a suitable catch or fastening at the bottom to hold the hames and collar together, as will be hereinafter more specifically described.

Referring to the accompanying drawings, which are made a part hereof, and on which similar letters of reference indicate similar parts, Figure 1 is a side elevation of a collar and pair of hames embodying my invention; Fig. 2, a front elevation of the same; Fig. 3, a view similar to Fig. 2, except that the hames and collar are open; Fig. 4, a detailed view, on an enlarged scale, of so much of Fig. 3 as embodies the hinge-joint and spring; and Fig. 5, a longitudinal vertical section of Fig. 4.

In said drawings, the portions marked A represent the horse-collar; B B', the hames; C, the spring; D, a loop, and E a hook whereby the same may be suspended.

The collar A is much like other horse-collars that open at the bottom, and is secured firmly to the hames.

Each of the hames B B' terminates in a hinge part at its upper end, and the two are secured together by the hinge-pivot $b'$. The point where said hames are secured together is preferably somewhat to one side of the extreme top, as shown. Because of this location of the hinge the part of the collar which rests directly upon the horse's neck is kept stiff and firm, and also permits the horse to get into better position in relation thereto. The lower ends of the hames, where they meet, are provided with suitable catches, which lock said ends together when they are brought against each other. These catches, however, are no part of my invention, and are indicated as the preferable form of fastening merely.

The spring C is secured firmly to the hame B', and its end extends over the projection $b$ on the hame B. Said spring is bent so as to engage with said projection, and thus hold the hame B and the portion of the collar attached thereto up in the position shown most clearly in Fig. 3 when it is desired that they shall be in that position. When it is desired to close the hames and collar a slight pull on the suspended hame will start it down, and the action of the spring is then exerted upon the other side of the projection $b$, as shown in Fig. 2, and tends to force the hames together, instead of holding them apart.

As before stated, my said invention is principally intended for use in fire-departments. Harness for such use, as is well known, is suspended to the ceiling of the engine-house at the point where it is required for use. In Fig. 3 one of the suspension-hooks E is shown, and the lower ends of the cords which support it, and the collar is shown suspended thereto by means of the wire loop D upon the pivot $b'$, and this position is the one occupied by the collar when not in use. When an alarm is rung the horses take their places under the harness, the hame B is pulled down into the position shown in Fig. 2, and the principal portion of the labor of harnessing the horses is thus instantaneously accomplished. The object of all improvements of this character being to attain the greatest speed in harnessing, it will be readily seen that this device is of much value as a step in that direction.

Having thus fully described my said invention, what I claim as new, and desire to secure by Letters Patent, is—

1. The combination, with a pair of hames hinged together at the top, of a spring attached to one hame and a projection upon the other, whereby said hames are held open or permitted to close, substantially as set forth.

2. The combination of the hame B, having the projection $b$ thereon, and the hame B', having the spring C secured thereto, said hames being hinged together by the hinge-pivot $b'$, substantially as shown and specified.

3. A pair of hames hinged together at the top, and provided with a suitable device for holding the hames distended when not in use, the point of location of the hinge being to one side of the center, substantially as set forth.

4. A pair of hames divided at the bottom and hinged together at the top, the point of location of the hinge-pivot being somewhat to one side of the center, as shown, whereby the extreme top of the collar is left perfectly rigid at all times, while at the same time the sides are adapted to swing from or toward each other at the bottom, substantially as shown and specified.

In witness whereof I have hereunto set my hand and seal, at Indianapolis, Indiana, this 14th day of September, A. D. 1882.

CICERO SEIBERT. [L. S.]

In presence of—
C. BRADFORD,
E. W. BRADFORD.